United States Patent Office 2,767,212
Patented Oct. 16, 1956

2,767,212

N-SUBSTITUTED THIOCARBAMYL CHLORIDE PERCHLORIDES

Ernest Jaul and William W. Levis, Jr., Wyandotte, Mich., assignors, by mesne assignments, to The Pennsylvania Salt Manufacturing Company, Philadelphia, Pa., a corporation of Pennsylvania No Drawing. Application August 2, 1952,
Serial No. 302,414

8 Claims. (Cl. 260—543)

The present invention pertains to a process for the preparation of new chlorinated organic compounds which are highly useful for various purposes such as chemical intermediates, chlorinating agents, etc.

The nature of these new compounds, and their preparation from N-substituted thiocarbamyl chlorides and chlorine, is illustrated as follows:

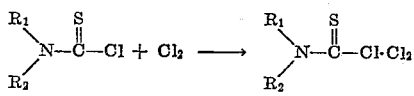

wherein $R_1$, taken individually, represents an alkyl radical; wherein $R_2$, taken individually, represents an alkyl radical; and wherein $R_1$ and $R_2$, taken collectively, represent one of the group consisting of polymethylene and oxapolymethylene radicals.

It will be understood that $R_1$ and $R_2$ may be the same or different in the N-substituted thiocarbamyl chloride reactants. The same consideration applies to the N-substituted thiocarbamyl chloride perchloride products of the invention.

Examples of alkyl radicals are methyl, ethyl, propyl, butyl, amyl, hexyl, heptyl, octyl, etc., and proceeding through octadecyl and higher, and including isomeric forms thereof.

The N-substituted thiocarbamyl chlorides which may be employed in the reaction include those in which the nitrogen atom is twice substituted by similar alkyl radicals, e. g. dimethyl-, diethyl-, dipropyl-, dibutyl-, diamyl-, dihexyl-, diheptyl-, dioctylthiocarbamyl chlorides, etc.; or by two dissimilar alkyl radicals, e. g. methyl-ethyl-, ethyl-propyl-, methyl-propyl-, butyl-amyl-, hexyl-dodecyl-, methyl-octadecyl-thiocarbamyl chlorides, etc.

Preferably the number of carbon atoms per alkyl radical attached to the nitrogen atom of the N-substituted thiocarbamyl chloride reactant does not exceed 12, and more particularly does not exceed 8.

Of particular interest are those products of the invention in which the carbamate nitrogen atom is substituted by two alkyl radicals having from 1 to 8 carbon atoms per radical.

The N-substituted thiocarbamyl chloride reactants may be prepared by any means known to the art, such as by the reaction of secondary amines and thiophosgene, or by the process described and claimed in U. S. Patent 2,466,276.

In accordance with the teachings of that patent, thiuram mono-, di-, and polysulfides are chlorinated, the products of such chlorination being N-substituted thiocarbamyl chlorides and free sulfur. If desired, the chlorides may be separated from the sulfur before the chlorides are employed as reactants in the present invention. Alternatively, however, such admixtures may be employed for reaction purposes without separation, the sulfur being substantially inert, under the reaction conditions employed, toward the reactants and the desired products. In such event, the products will of course contain sulfur as an impurity which may be separated from said products if desired.

In the practice of the present invention, the reactants are brought together in any desired way and reacted in a substantially non-aqueous system, the need for which becomes apparent when it is pointed out that we have discovered that the chloride perchloride products are very reactive to water. Although minor amounts of moisture may be tolerated, such as moisture which might be present in air overlying the reaction mixture, or in a so-called water-free industrial system, the presence of any substantial amount of water within the reaction mixture should be avoided. For best results, it is recommended that any gas which may overlie the reaction mixture be a dry gas, such as dry air or dry nitrogen.

It is preferred to employ the reactants in amounts which are substantially stoichiometric with respect to each other as shown in the foregoing equation, although an excess of either reactant may be used if desired for any reason. If excess chlorine is used, the excess merely fails to cause any further reaction, i. e. does not affect the chloride perchloride product, as will be seen in Example 1 below. If excess N-substituted thiocarbamyl chloride is used, the excess will not be converted to perchloride.

The reaction may be carried out in the presence or absence of a solvent or liquid diluent which preferably is nonreactive in the prevailing environment. The use of such solvent or diluent is ordinarily preferred, because contact between the reactants and agitation of the reaction mixture as the reaction proceeds are thereby facilitated. The particular solvent employed is not highly critical provided it be substantially inert in the reaction environment. Likewise, the amount employed may vary widely, although it may often be desirable to employ sufficient solvent to maintain the N-substituted thiocarbamyl chloride in liquid phase. Suitable solvents, for example, include aliphatic hydrocarbons such as hexane, petroleum naphtha, kerosene, etc., and chlorinated hydrocarbons, such as carbon tetrachloride, chloroform, etc.

It will of course be understood that the melting points of the N-substituted thiocarbamyl chlorides coming within the scope of this invention will differ widely; in fact, many are liquids at temperatures below those contemplated for the preferred conduct of the present invention. In such event, the non-reacting liquid, if employed, will function primarily as a diluent for the N-substituted thiocarbamyl chloride, and possibly also as a solvent for the product.

Regardless of whether or not the reaction is carried out in the presence of a solvent or diluent, it is highly desirable to make certain that good contact between the reactants is maintained during the reaction.

Reaction usually occurs readily at room temperature, reaction temperatures below 100° C. being preferred, such as between —20° C. and 100° C., and more particularly between 20° C. and 80° C. Lower temperatures may be used, but usually are attended by a reduced reaction velocity and a reduced fluidity of the reaction mixture. Higher temperatures may be employed, but consideration should be given to the thermal stability of the N-substituted thiocarbamyl chloride being reacted, as well as of the desired reaction product.

The reaction may be carried out at any desired pressure, such as atmospheric, sub-atmospheric, or super-atmospheric, atmospheric pressure being very suitable in most instances, particularly when it is desired to supply chlorine to the reaction mixture in vapor phase. Super-atmospheric pressure may be resorted to if it is desired to supply the chlorine in liquid phase.

The reaction may be carried out in batch, semi-continuously, or continuously as desired.

The organic products of the reaction may be recovered from the reaction mixture in any convenient way, such as by evaporation of solvent in which the reaction may have been carried out. These products may be shown by chemical analysis to correspond closely in empirical formula to the respective expected and desired products.

The following examples, which are by way of illustration and not of limitation, describe specific embodiments of the invention.

Example 1

Diethylthiocarbamyl chloride (606 g., or 4 moles) which had been recrystallized from hexane was dissolved in 1600 g. of carbon tetrachloride. The solution was charged into a 3-liter, round-bottom flask which was equipped with thermometer, glass stirrer, and glass inlet tube (10 mm. diameter) connetcted to a cylinder of chlorine. The solution was stirred and chlorine was introduced below the surface of the liquid, the temperature of the reaction mixture being maintained at approximately 25° C. Solid product separated as the reaction progressed. After 4 moles of chlorine has been absorbed the reaction was complete, as evidenced by the fact that the mixture gained no more weight upon further introduction of chlorine. Chlorination was discontinued, the reaction mixture was transferred to a 3-liter distilling flask, and the solvent was removed under reduced pressure. The diethylthiocarbamyl chloride perchloride thus obtained was a yellow solid. It reacted vigorously with water and was extremely hydroscopic.

Example 2

The diethylthiocarbamyl chloride employed in this example had been distilled twice and was of good purity. Chlorine was introduced into a solution of 75.3 g. (approximately 0.5 mole) of this chloride in 600 g. of carbon tetrachloride. Substantially the same procedure was used as in Example 1, except that the maximum temperature of the reaction mixture during the reaction was 51° C. Solid product separated as the reaction progressed. Introduction of chlorine was discontinued after the weight gain of the mixture corresponded to 0.5 mole of chlorine.

The solid diethylthiocarbamyl chloride perchloride was recovered by filtering the reaction mixture, this step being carried out in a "dry box" in a dry nitrogen atmosphere. The filter cake after being rinsed with ether was transferred to a 1-liter distilling flask, which was placed under reduced pressure in order to remove residual solvent.

The product was analyzed with results as follows. Calculated for $C_5H_{10}Cl_3NS$: Cl, 47.8%; N, 6.3%. Found: Cl, 47.4, 48.1%; N, 6.3, 6.5%.

For purposes of brevity and to avoid needless repetition of examples, it is merely necessary to point out that any other N-substituted thiocarbamyl chloride of this invention may be substituted for the diethylthiocarbamyl chloride employed as reactant in the above examples, and that the same or any other suitable reaction conditions may be employed, all of which will be well understood by persons skilled in the art.

The perchlorides of this invention are powerful chlorinating agents as is illustrated by the following equation, the reaction being carried out in a substantially non-aqueous system:

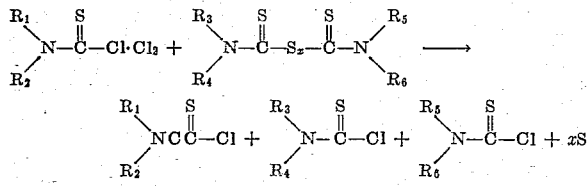

wherein $R_1$ and $R_2$ have the same meanings as above; wherein $R_3$ and $R_4$ have the same meanings as defined in connection with $R_1$ and $R_2$ above; wherein $R_5$ and $R_6$ have the same meanings as defined in connection with $R_1$ and $R_2$ above; and wherein $x$ is an integer. Thus $R_1$, $R_2$, $R_3$, $R_4$, $R_5$, and $R_6$ taken individually may be the same or different, including the situation where two or more are the same. When two R radicals are taken collectively, e. g., $R_1$ and $R_2$ collectively, $R_3$ and $R_4$ collectively and/or $R_5$ and $R_6$ collectively, the respective radicals represented may be the same or different, including the situation where two such radicals are the same. The substitution on each nitrogen atom may be either by monovalent or divalent radicals, and the valances of such radicals attached to the respective nitrogen atoms may be the same or different, including the situation where the valances of radicals attached to two nitrogen atoms are the same.

Examples of $R_1$ and $R_2$ have been given above. Examples of the integer $x$ are 1, 2, 3, and 4. Examples of thiuram sulfides corresponding to the above formula are tetramethylthiuram disulfide, tetraethylthiuram disulfide, tetrapropylthiuram disulfide, tetrabutylthiuram disulfide, sym. diethyldiphenylthiuram disulfide, sym. diethyldimethylthiuram disulfide, unsym. diethyldimethylthiuram disulfide, sym. dibutylditolythiuram disulfide, dipentamethylenethiuram disulfide, di-3-oxopentamethylenethiuram disulfide, and the corresponding thiuram mono-, tri-, and tetrasulfides.

The following example illustrates the use of the perchlorides in the reaction of the preceding equation.

Example 3

Approximately 0.2 mole each of diethylthiocarbamyl chloride perchloride and of tetraethylthiuram disulfide were mixed in a 500 cc. Erlenmeyer flask. The mixture was maintained in molten condition (at about 80° C.) for five hours, and was filtered hot. The sulfur which remained on the filter weighed 12 g. The filtrate, which was diethylthiocarbamyl chloride, weighed 79 g., a conversion of approximately 87%. This product had a setting point of 46° C. and a melting point of 46–49° C. The product, after being recrystallized from hexane, melted at 48–50° C.

To avoid needless repetition of examples, we wish to point out that any other thiuram sulfide of this invention may be substituted in Example 3; that any other N-substituted thiocarbamyl chloride perchloride of this invention may be substituted in Example 3; and that any other suitable reaction conditions, including temperature, pressure, and the presence or absence of a solvent or diluent may be employed, and more particularly the reaction conditions disclosed herein in connection with the production of the N-substituted thiocarbamyl chloride perchlorides.

It is to be understood that the more patricular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

We claim:

1. Organic compounds having the formula

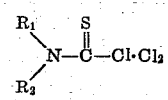

wherein $R_1$ and $R_2$ each represent an alkyl radical having from 1 to 8 carbon atoms.

2. Diethylthiocarbamyl chloride perchloride having the formula

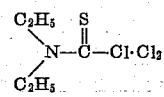

3. A process for the preparation of compounds having the formula

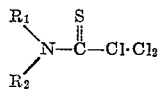

wherein $R_1$ and $R_2$ each represent any alkyl radical having from 1 to 8 carbon atoms, which comprises contacting under substantially non-aqueous conditions and under temperature conditions not exceeding 100° C. chlorine and a compound having the formula

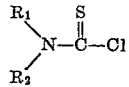

wherein $R_1$ and $R_2$ have the same meanings as above, and maintaining said contact between said reactants until reaction therebetween occurs.

4. The process of claim 3 in which the reaction is conducted in the presence of a liquid diluent which is substantially non-reactive under the conditions existing in the reaction zone.

5. The process of claim 3 in which temperature conditions are maintained between —20° C. and 100° C.

6. The process of claim 3 in which temperature conditions are maintained between 20° C. and 80° C.

7. The process of claim 3 in which the reactants are employed in substantially stoichiometric amounts.

8. In the manufacture of diethylthiocarbamyl chloride perchloride, the process comprising contacting under substantially non-aqueous conditions diethylthiocarbamyl chloride with chlorine until reaction therebetween occurs, said reaction being conducted under temperature conditions not exceeding 100° C. and in the presence of a liquid diluent which is substantially inert under the conditions obtaining in the reaction zone, and recovering from the reaction mixture the diethylthiocarbamyl chloride perchloride thus produced.

References Cited in the file of this patent

UNITED STATES PATENTS 2,466,276     Ritter _____ Apr. 5, 1949

OTHER REFERENCES

Fieser et al., 2nd Ed. Heath, page 32.